United States Patent [19]

Dennis et al.

[11] Patent Number: 4,734,902
[45] Date of Patent: Mar. 29, 1988

[54] RECORD PLAYER

[75] Inventors: James T. Dennis, 2312 NW. 57th St., Oklahoma City, Okla. 73112; George Kolomayets, Chicago, Ill.

[73] Assignee: James T. Dennis, Oklahoma City, Okla.

[21] Appl. No.: 732,242

[22] Filed: May 8, 1985

[51] Int. Cl.[4] .................... G11B 17/08; G11B 17/16
[52] U.S. Cl. .................... 369/176; 369/203; 369/244; 369/258; 369/263
[58] Field of Search ............ 369/176, 244, 258, 263, 369/264, 182, 270, 271, 203, 230, 245

[56] References Cited

U.S. PATENT DOCUMENTS

| | | | |
|---|---|---|---|
| 2,613,081 | 10/1952 | Fisher | 369/203 |
| 3,025,066 | 3/1962 | Siebert | 369/263 |
| 3,741,567 | 6/1973 | Bis | 369/270 |
| 4,004,816 | 1/1977 | Guha | 369/182 |
| 4,012,048 | 3/1977 | Hawkins | 369/270 |
| 4,106,775 | 8/1978 | Takizawa | 369/203 |
| 4,113,264 | 9/1978 | Sato et al. | 369/182 |
| 4,291,886 | 9/1981 | Dennis et al. | 369/203 |
| 4,373,200 | 2/1983 | Dunlop | 369/263 |

Primary Examiner—Steven L. Stephan
Attorney, Agent, or Firm—Mason, Kolehmainen, Rathburn & Wyss

[57] ABSTRACT

An auto return record player is provided which can be simply and economically adapted to function as an automatic set down player. Either the auto return player or the automatic set down player is capable of playing a record on the turntable twice and then returning the tone arm to the rest post and shutting the machine off, the tone arm being automatically set down on the lead-in groove of the record between the first and second playing cycles. The record player is of the so-called quarter panel sub base type and may be assembled in a main base or cabinet without removing the turntable from the quarter panel sub base. The record player also has a 45 rpm record adaptor which is provided with an integral stub centering spindle portion for small hole records which may be grasped to lift the adaptor to a 45 rpm large hole record playing position, the adaptor covering a separate inexpensive stub shaft which acts as a bearing for the turntable.

51 Claims, 17 Drawing Figures

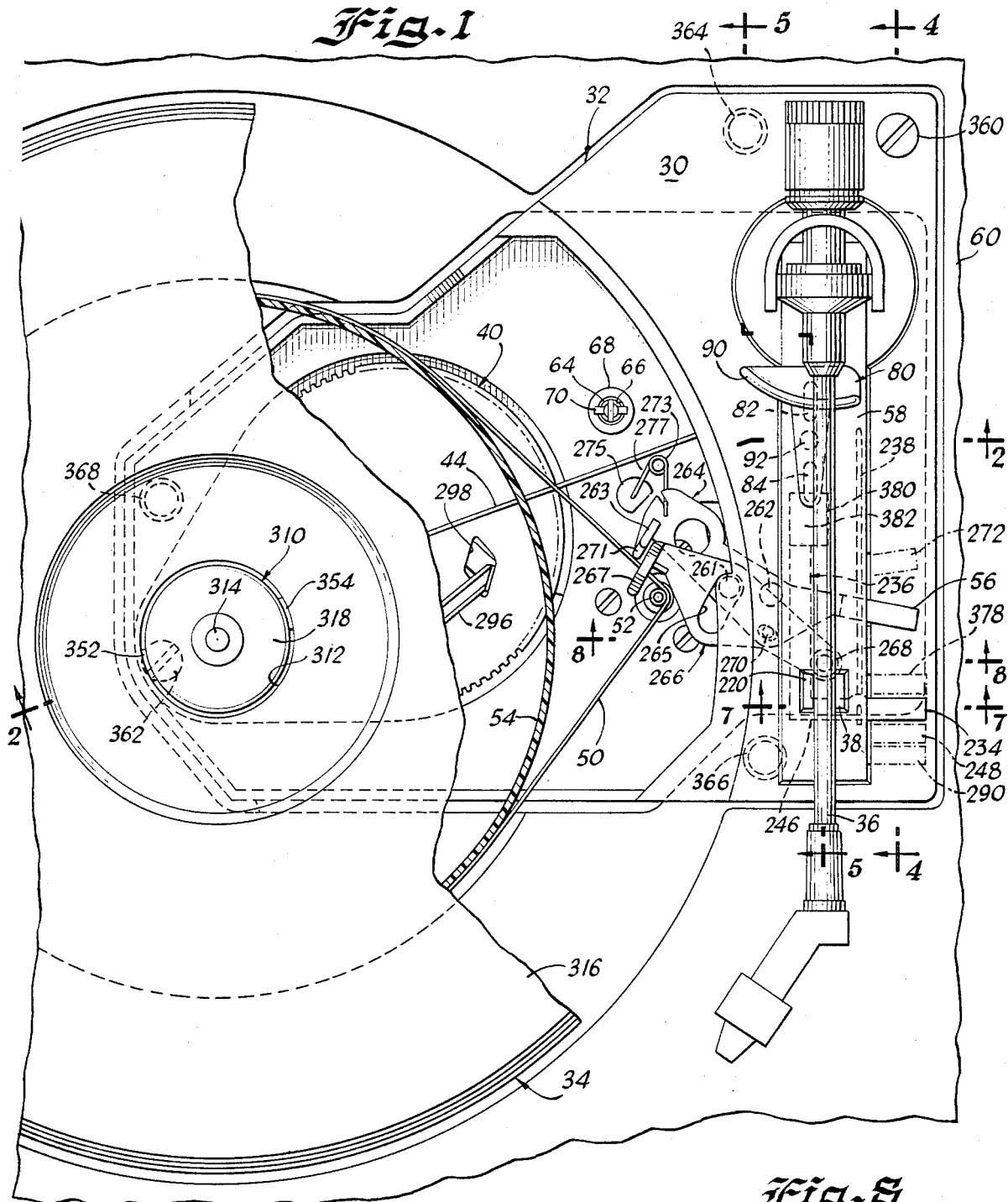
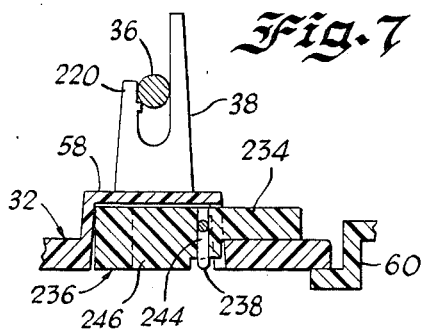
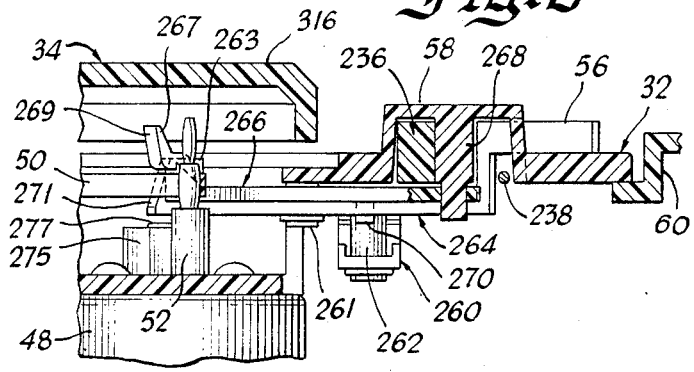

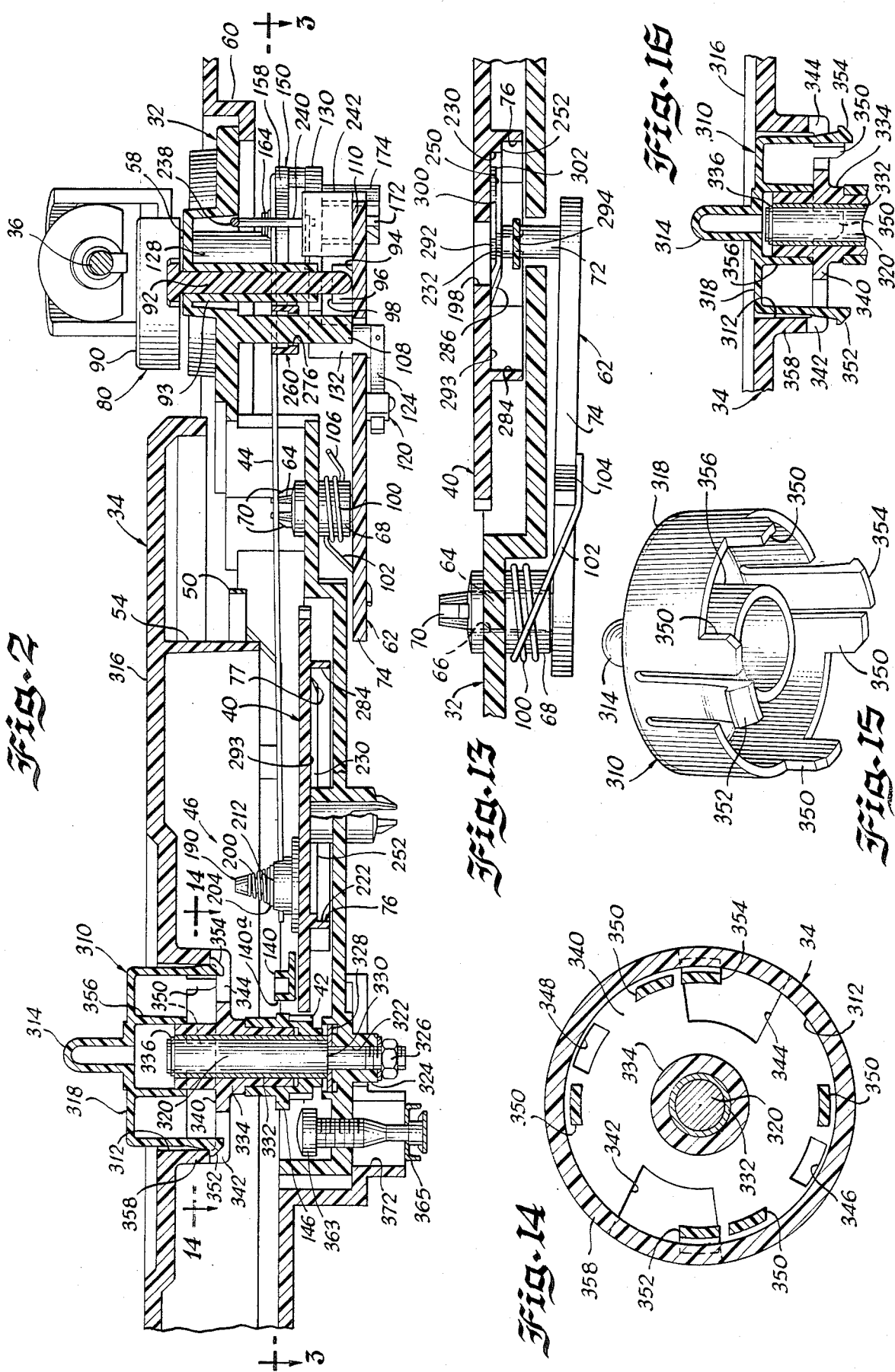

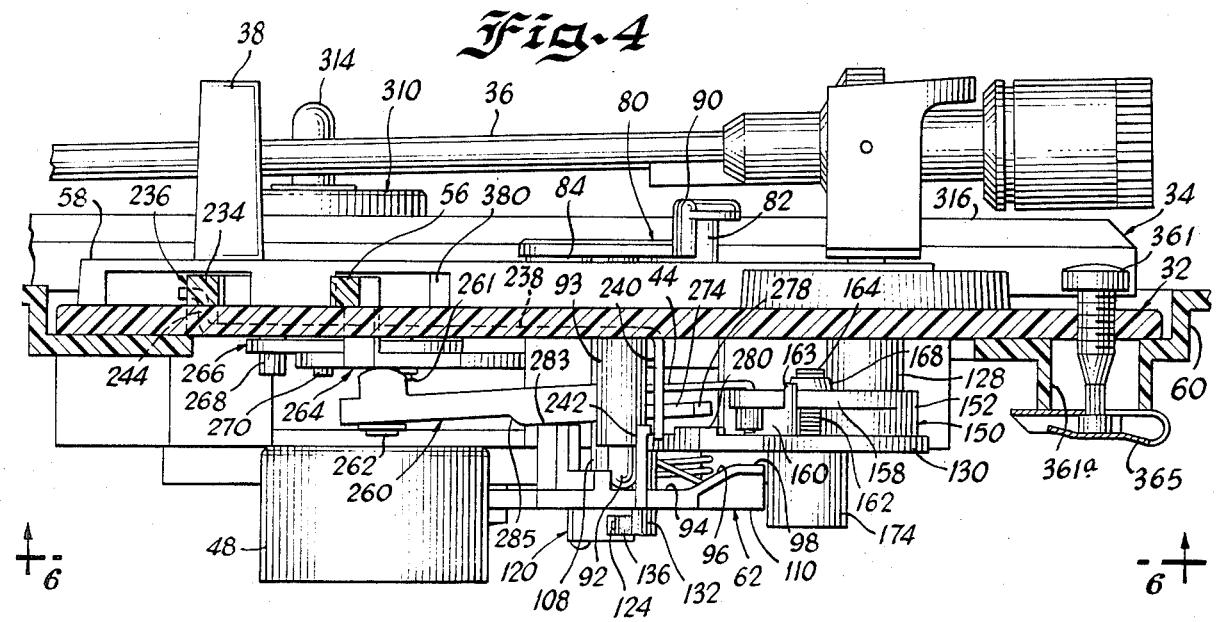
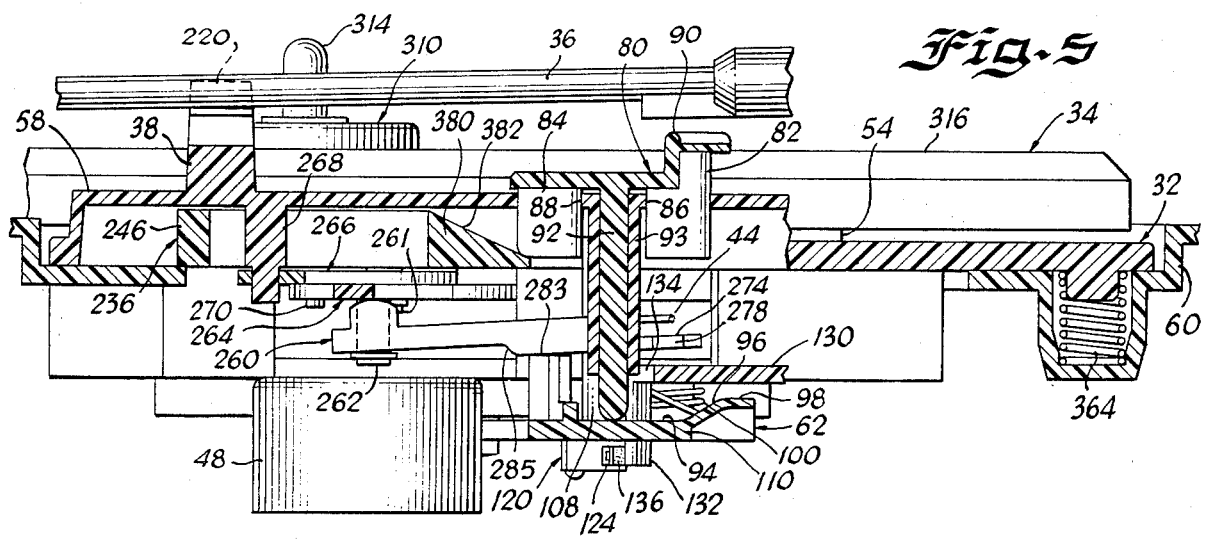
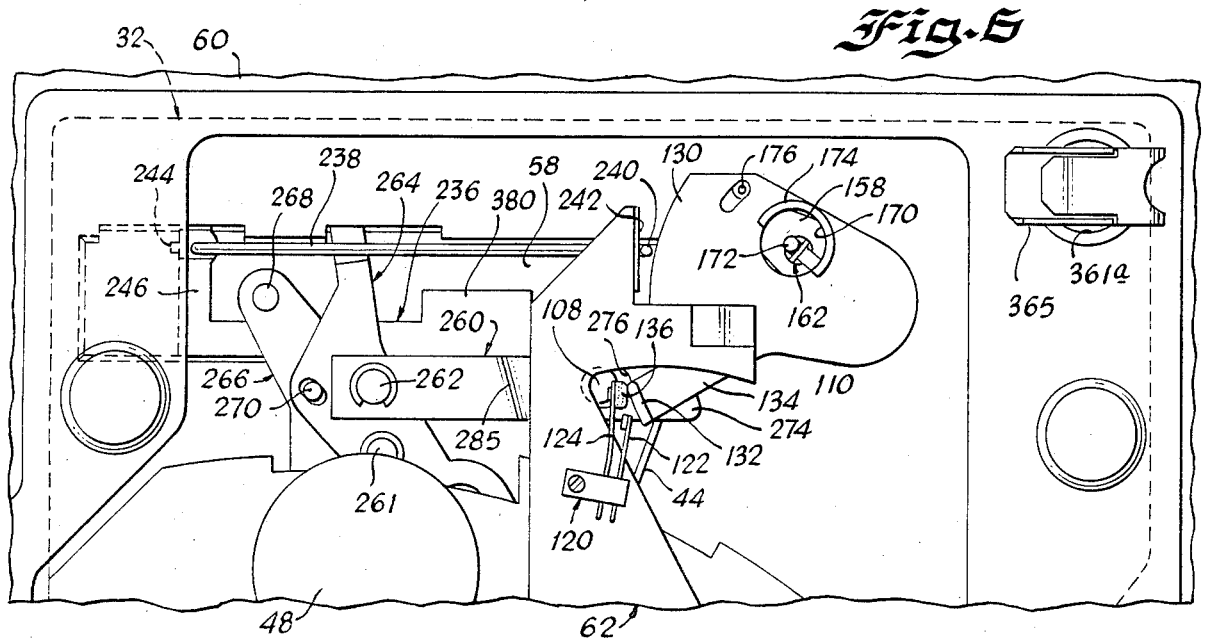

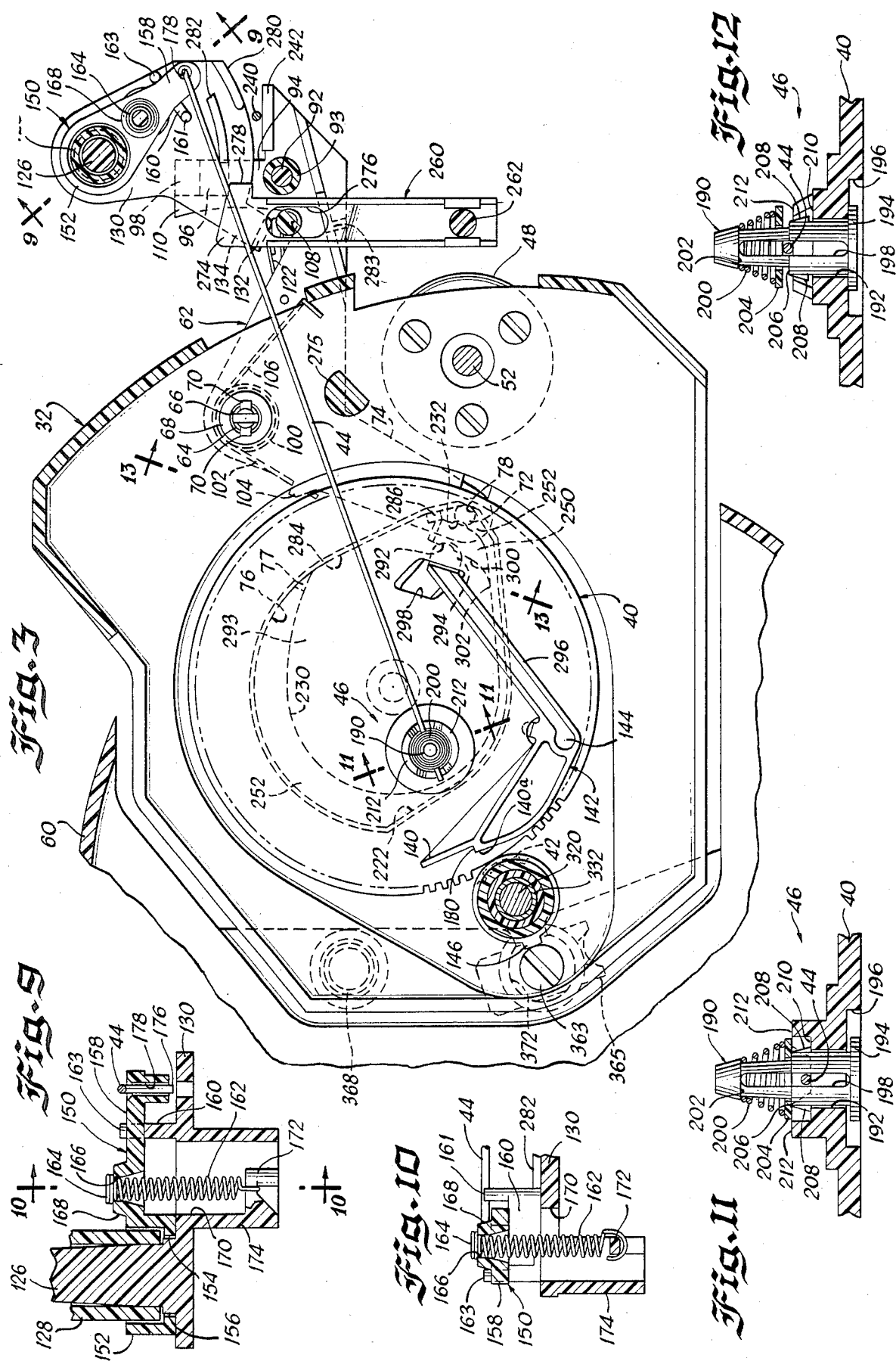

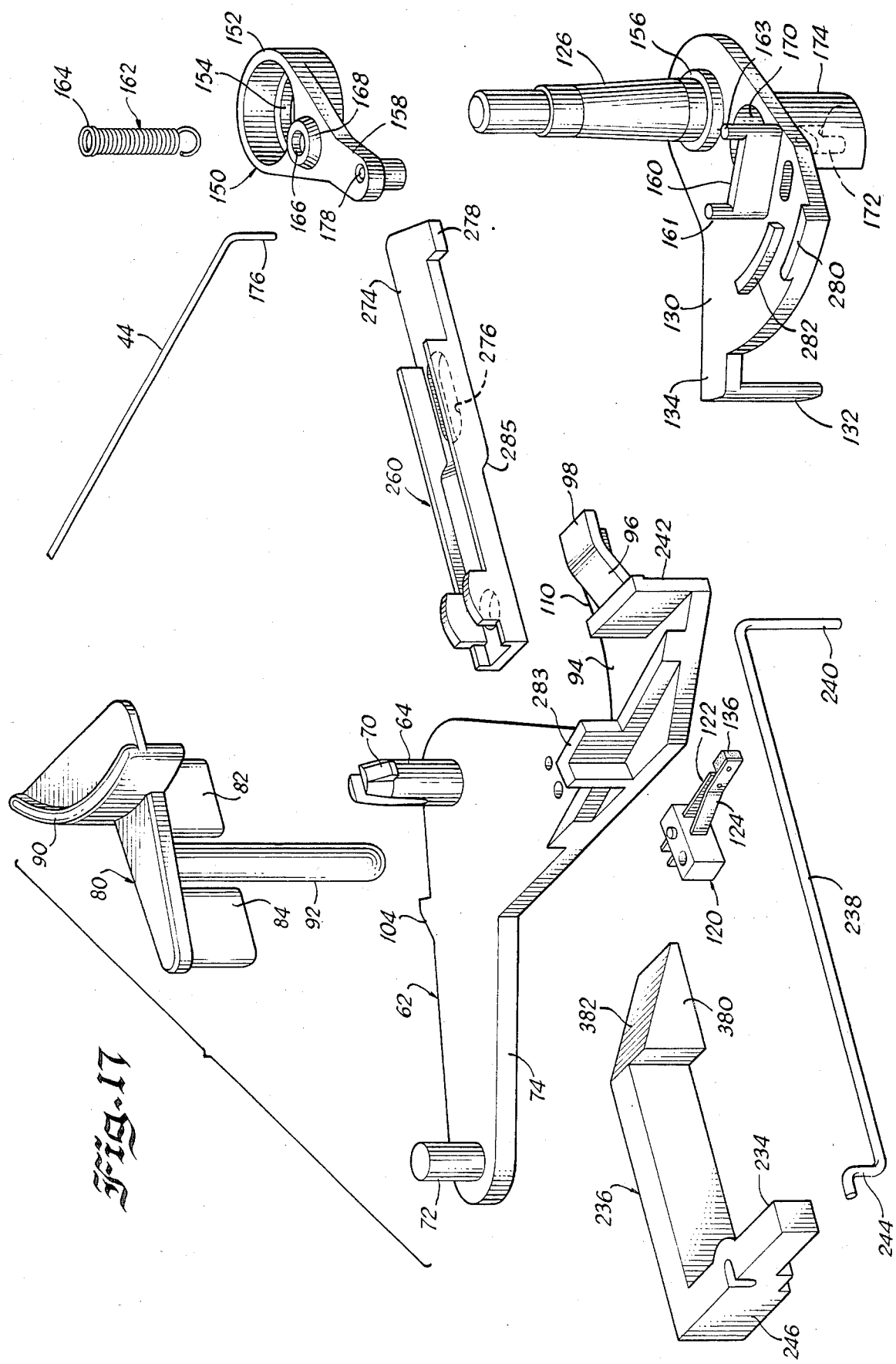

RECORD PLAYER

The present invention is directed to record players, and, more particularly, to record players of the so-called auto return type in which the act of manually placing the tone arm on a single record on the turntable starts the machine and after the record is played the tone arm is automatically returned to the rest post and the machine turned off during an automatic shut-off cycle.

The invention is specifically directed to such an auto return player which can be simply and economically adapted to be a so-called automatic set down player in which movement of a control knob to an "auto" position starts the machine and initiates an automatic set down cycle during which the tone arm is automatically set down on the lead-in groove of a 7 inch or 12 inch record and after the record is played an automatic shut-off cycle is initiated in which the tone arm is automatically returned to the rest post and the machine turned off.

In accordance with a further feature of the invention an auto return player is provided which is capable of playing a record on the turntable twice and then returning the tone arm to the rest post and shutting the machine off, the tone arm being automatically set down on the lead-in groove of the record between the first and second playing cycles.

In accordance with still another feature of the invention an automatic set down player is provided which is capable of playing a record on the turntable twice in response to movement of the control knob to a repeat position after the tone arm has been automatically positioned on the record for the first playing thereof.

With the increased emphasis on high fidelity in phonograph record playing systems and the increasing concern about the condition, wear and life expectancy of records played on an automatic record changer, various arrangements have been proposed for playing a single record in which a stub spindle is provided in place of the spindle which supports a stack of records in an automatic record changer. In general, these arrangements have been quite complicated and expensive to manufacture on a mass production basis. In addition, automatic record changers, such as shown for example in Dennis et al U.S. Pat. No. 4,291,886, are capable of playing a single record but are much too complicated and expensive to be a factor in the single record player market.

In single record players it has become customary to manufacture the record player by assembling the turntable, motor and tone arm mechanism on a sub base and the assembled unit is then tested and shipped to the phonograph manufacturer who then installs the tested sub base unit in a main base or cabinet which is then sold to a customer. Since these sub base units must be shipped long distances, efforts have been made to reduce the size and weight of these sub base units by constructing the sub base as a so-called quarter panel unit which extends beyond the edge of the turntable in only a limited area usually less than 120 degrees around the periphery of the turntable. Such quarter panel units have the advantage that they are smaller, require less plastic in the sub base, occupy less shipping space and weigh less. However, existing quarter panel units suffer from several disadvantages. Despite the fact that the turntable is assembled and tested with a particular sub base mechanism at the time of original manufacture, when this sub base unit is shipped to the phonograph manufacturer the turntable must be removed from the sub base in order to mount the sub base in the main base, since only a small area of the sub base extends beyond the edge of the turntable. Removing the turntable at the phonograph manufacturer's plant leads to many difficulties because the turntables may not be reassembled with the same sub base with which they were originally tested so that rumble and noise specifications may not be met. Also, removing and replacing the turntable by the phonograph manufacturer requires considerable time and labor which must be added to the cost of the final unit.

The sub base may also be shock mounted to the main base by means of coil springs which are positioned between the sub base and the main base. A plurality of transit screws extending between the sub base and main base are then rotated to clamp the sub base tightly to the main base by compressing the coil springs for shipment to the customer. Tightening and loosening of these transit screws also requires removal of the turntable in quarter panel units which again gives rise to all of the above mentioned difficulties at the plant of the phonograph manufacturer. A similar problem arises after the quarter panel unit is sold to the customer since he must remove the turntable and loosen the transit screws in order to shock mount the unit. Furthermore, he must do this not only at the time he purchases the unit, but each time he wishes to move the phonograph to a different location.

From the above, it will be seen that it would be extremely desirable to provide a quarter panel sub base unit which could be shipped to phonograph manufacturers and assembled in a main base without removing the turntable.

A further disadvantage of prior single record players is that the stub spindle for centering a record on the turntable also acts as the bearing for the rotatable turntable. Since the stub spindle must be very smooth it must be made of stainless steel and is quite expensive. A chrome plated spindle, which would be less expensive, cannot be used because the chrome plating could peel, crack or flake off and damage the turntable bearing. Also, 45 rpm record adaptors which have been used with such stainless steel stub spindles must have recesses in the top surfaces thereof to permit the adaptor to be grasped and lifted up out of a recess in the turntable to center a large hole 45 rpm record. These recesses give a cluttered look in the area of the centering spindle and prevent the single record player from having the appearance of higher priced turntables.

It is, therefore, a primary object of the present invention to provide a new and improved single record player which avoids one or more of the above discussed disadvantages of prior art arrangements.

It is another object of the present invention to provide a new and improved single record player of the auto return type which is extremely simple and inexpensive to manufacture, assemble and test on a mass production basis.

It is a further object of the present invention to provide a new and improved single record player of the auto return type which can be readily and economically adapted to be an automatic set down single record player.

It is another object of the present invention to provide a new and improved single record player of the auto return type which is capable of playing a record on the turntable twice and then returning the tone arm to the rest post and shutting off the machine.

It is a further object of the present invention is to provide a new and improved automatic set down single record player which is capable of playing a record on the turntable twice in response to movement of the control knob to a repeat position after the tone arm has been positioned on the record for the first playing thereof.

It is another object of the present invention to provide a quarter panel single record player unit which can be mounted in a main base without removing the turntable from the quarter panel unit.

It is another object of the present invention to provide a quarter panel single record player unit which can be shock mounted in a main base and securely clamped thereto for shipment without removing the turntable from the quarter panel unit.

It is a further object of the present invention to provide a new and improved stub centering spindle arrangement which is inexpensive to manufacture and has the appearance of a high priced turntable.

It is another object of the present invention to provide a new and improved single record player in which a 45 rpm adaptor, which may be conveniently and inexpensively molded in plastic, is provided with a stub centering spindle portion which may be grasped to lift the adaptor to a 45 rpm record playing position, the adaptor covering an inexpensive stub shaft which acts as a bearing for the turntable.

In addition, the disclosed single record player has a number of other desirable features which can be used in either a record player or an automatic record changer, as will be described in more detail hereinafter.

The invention both as to its organization and method of operation, together with further objects and advantages thereof, will best be understood by reference to the following specification taken in connection with the accompanying drawings, in which:

FIG. 1 is a plan view of the single record player of the present invention showing the sub base unit thereof mounted in a main base or cabinet and with portions of the turntable broken away;

FIG. 2 is a sectional view taken along the line 2—2 of FIG. 1;

FIG. 3 is a sectional view taken along the line 3—3 of FIG. 2;

FIG. 4 is a sectional view taken along the line 4—4 of FIG. 1;

FIG. 5 is a section view taken along line 5—5 of FIG. 1;

FIG. 6 is a sectional view taken along line 6—6 of FIG. 4;

FIG. 7 is a sectional view taken along line 7—7 of FIG. 1;

FIG. 8 is a sectional view taken along the line 8—8 of FIG. 1;

FIG. 9 is a sectional view taken along the line 9—9 of FIG. 3;

FIG. 10 is a sectional view taken along the line 10—10 of FIG. 9;

FIG. 11 is a sectional view taken along the line 11—11 of FIG. 3;

FIG. 12 is a view similar to FIG. 11 but showing the tone arm drive clutch in a different position;

FIG. 13 is a sectional view taken along the line 13—13 of FIG. 3;

FIG. 14 is a sectional view taken along the line 14—14 of FIG. 2;

FIG. 15 is a perspective view of the 45 rpm adapter of the present invention;

FIG. 16 is a fragmentary sectional view similar to FIG. 2 but showing the 45 rpm adaptor in its lower position; and FIG. 17 is an exploded perspective view of certain components of the record player of FIG. 1.

Referring now to the drawings, the single record player of the present invention is therein illustrated as comprising a sub base unit indicated generally at 30. The sub base unit 30 includes a so-called quarter panel base member 32 on which all of the components of the single record player are mounted. More particularly, a turntable 34 is rotatably mounted on the base member 32 near one edge thereof and a tone arm 36 is pivotally mounted on the base member 32 and is normally seated on a rest post 38, provided on a raised housing portion 58 of the base 32, when no record is being played. A cycle gear indicated generally at 40 is rotatably mounted on the base 32 and is positioned between the turntable 34 and the upper surface of the base member 32. The cycle gear 40 is rotated one revolution during an automatic cycle by engagement of the teeth thereof with a gear 42 (FIG. 2) on the hub of the turntable 34, this automatic cycle being initiated by means of a velocity tripping mechanism described in more detail hereinafter.

The cycle gear 40 is interconnected with the tone arm 36 through an elongated tone arm drive and velocity trip link 44 which extends from a clutch member indicated generally at 46, positioned on the upper surface of the gear 40 and offset from the center thereof, the other end of the link 44 being connected to the tone arm 36 through a velocity trip friction clutch which will be described in more detail hereinafter. Generally considered the link 44 and clutch 46 function in a manner similar to that described in Dennis et al U.S. Pat. No. 4,291,886 and reference may be had to said patent for a detailed description of the operation of this portion of the single record player of FIG. 1. However, it is pointed out that the arrangement of the present invention provides an improved construction for the clutch 46 and also an improved construction for the velocity trip frictional interconnection between the link 44 and the tone arm 46, as will be described in more detail hereinafter.

The turntable 34 is arranged to be driven from a motor 48 (FIG. 3) through a belt 50 which extends from a two speed turret 52 mounted on the shaft of the motor 48 and a flange 54 formed on the underside of the turntable 34. The speed of the turntable 34 may be changed from 33⅓ rpm to 45 rpm by adjustment of a combined speed and size selector knob 56 which extends through an opening in the side of the raised housing portion 58 of the base member 32. The knob 56 is directly connected to a belt shifting mechanism which functions to shift the belt 54 vertically between the two steps on the turret 52, as will be described in more detail hereinafter. The knob 56 also functions to control the position of a tone arm indexing mechanism so that the tone arm 36 is automatically positioned over the lead in groove of either a 7 inch 45 rpm record or a 12 inch 33 and ⅓ rpm record to provide an automatic set down function, as will be described in more detail hereinafter.

As is clearly evident from FIG. 1, the sub base unit 30 is of the so-called quarter panel type wherein the base member 32 and the components mounted thereon extend outwardly beyond the edge of the turntable 34 through only a limited arc of less than 120°. A quarter panel sub base unit is particularly desirable in that it requires less plastic than a larger base unit, occupies less shipping space and weighs less than larger base units so that quarter panel units may be shipped long distances before they are assembled into a main base or cabinet at the phonograph manufacturers plant. In accordance with an important aspect of the present invention the sub base unit 30 is arranged to be mounted within a main base or cabinet indicated generally at 60 without removing the turntable 34 from the base member 32, as will be described in more detail hereinafter.

A control arm 62 is pivotally mounted on the underside of the base member 32 and performs a number of functions in the single record player of the present invention. More particularly, the control arm 62 is provided with an upstanding pivot pin 64 (FIG. 17) which extends upwardly through an opening 66 in a boss portion 68 (FIG. 2) formed in the base member 32, the pin 64 being provided with a split upper section provided with the outwardly extending retaining shoulders 70 so that the control arm 62 may be readily inserted through the opening 66 and the shoulders 70 positioned above the upper surface of the boss 68 on the top side of the base member 32 to retain the control arm 62 while permitting its rotation about the axis of the pin 64.

The control arm 62 is provided with an upstanding cam follower pin 72 on the outer end of the arm portion 74 of the control arm 62, the pin 72 extending through a clearance slot in the base member 32 and being positioned in engagement with an outer control track or cam 76 (FIG. 3) formed in the underside of the cycle gear 40. More specifically, the pin 72 is positioned in a detent notch portion 78 of the control track 76 when the gear 40 is in the rest position shown in FIG. 3 and as the gear 40 is rotated during an automatic cycle the pin 72 follows the control track 76 and produces pivotal movement of the control arm 62 about the pin 64. This pivotal movement of the control arm 62 is employed to control vertical movement of the tone arm 36 so that it is lifted off of the record at the end of a playing cycle and is moved downwardly, either into engagement with the rest post 38 or into engagement with a record on the turntable 34, as will be described in more detail hereinafter. More particularly, a tone arm lift member indicated generally at 80 is mounted for vertical movement in the base 32 by means of a downwardly extending post portion 92 which is slidably mounted within a downwardly extending sleeve portion 93 (FIG. 2) of the base 32 and is adapted to ride over the upper surface of the portion 94 (FIG. 17) of the control cam 62, this surface including a ramp portion 96 and an upper platform portion 98. A pair of downwardly extending flange portions 82 and 84 extend through the slots 86 and 88, respectively, provided in the top wall of the raised housing portion 58 of the base member 32 and prevent the lift member 80 from rotat- ing.

The lift member 80 is provided with a curved upper flange portion 90 which is adapted to engage the underside of the tone arm at a point spaced from the pivotal axis thereof so that as the member 80 is raised the outer end of the tone arm 36 may be lifted off of a record to an elevation at which it may be swung outwardly and placed on the rest post 38 or back over the lead in groove of a record on the turntable 34. As the control arm 62 is rotated by engagement of the cam follower pin 72 with the control track 76, the post portion 92 of the lift member is moved upwardly along the ramp 96 so as to lift the tone arm 36 off of a record on the turntable at the start of an automatic cycle. As the control arm 62 continues to rotate, the post 92 is moved onto the upper platform portion 98 and remains elevated until the control arm 62 is rotated in the opposite direction and the post is moved back down the ramp 96 and over the surface 94, such movement being controlled by the shape of the control track 76.

In accordance with an important feature of the invention, the opening 66 in the boss 68 is considerably larger than the diameter of the pin 64 so that the control arm 62 is loosely mounted within the boss 68 so that it can tilt slightly as well as rotate. A torsion spring 100 (FIG. 2), which is positioned around the boss 68, is provided with a first arm portion 102 which is positioned under a projecting lug portion 104 on the arm 74 of the control arm 62. The other end 106 of the torsion spring 100 is connected to the base member 32 so that the spring 100 tends to rotate the control arm 62 in a counterclockwise direction as viewed in FIG. 3 and biases the cam follower pin 72 outwardly into engagement with the inner surface of the control track 76 as the gear 40 is rotated during an automatic cycle. Furthermore, due to the loose mounting of the pin 64 within the opening 66, the arm portion 102 of the spring 100, which bears against the lug 104, exerts an upward bias on the cam follower pin 72 on one end of the control arm 62 to hold the pin 72 in engagement with the gear 40. This upward bias is due to the fact that the arm portion 102 engages the lug 104 at a point spaced from the pin 64. Also, since the arm 102 engages the edge of the control arm 62 at a point below the upper end of the pin 72 and the shoulder 70 which is supported on the top of the boss 68, the torsional force of the spring arm 102 also produces an upward bias on the other end of the control arm which includes the tone arm cam surfaces 94, 96 and 98. A downwardly extending post 108 (FIG. 2) is formed in the base member 32 adjacent the sleeve portion 93 of the base 32 in which the post portion 92 of the tone arm lift member 80 is slidably mounted. The above described torsional force of the torsion spring arm 102 produces an upward bias which holds the outer edge portion 110 (FIG. 17) of the control arm 62, which is adjacent the cam surfaces 94, 96 and 98 in engagement with the bottom end of the post 108 so that this post acts as a reference plane against which vertical movement of the tone arm is referenced.

The control arm 62 also functions, in conjunction with the tone arm 36, to control energization of the turntable motor 48. More particularly, a shut off switch 120 is mounted on the bottom side of the control arm 62 and includes a pair of switch arms 122 and 124 (FIG. 6). The tone arm 36 is pivotally mounted on the upper end of a tone arm pivot post 126 which is journalled in a downwardly extending sleeve bearing portion 128 (FIG. 4) formed in the base member 32. A tone arm indexing or quadrant plate 130 is secured to the bottom end of the post 126 and has a downwardly extending control arm 132 on a radially extending arm portion 134 thereof. When the tone arm 36 is positioned on the rest post 38 and the gear 40 is in the rest position shown in FIG. 3, the control arm 132 is positioned to engage a block 136 mounted on the longer spring arm 124 and holds this spring arm away from the spring arm 122 (FIG. 6) so that the switch 120 is open and the motor 48 is deenergized.

Considering now the operation of the single record player of the present invention in an auto return mode, when the tone arm 36 is lifted off of the rest post 38 and manually moved into engagement with the lead in groove of the record on the turntable 34, this inward movement of the tone arm 36 moves the control arm 132 away from the switch arm 124 so that the switch 120 is closed and the motor 48 energized so that the turntable 34 starts to rotate. The record on the turntable 34 is then played. As the tone arm 36 moves across the record the drive-trip link 44, which is loosely retained in the clutch 46 when the gear 40 is at rest, moves with the tone arm. As the tone arm nears the lead out groove of the record, the end of the link 44 engages the flange 140 (FIG. 3) on a tripping pawl 142 which is rotatably mounted on the upper surface of the cycle gear 40 at the pivot 144. As the flange 140 is moved inwardly, a projecting lug 146 on the hub portion of the turntable 34 strikes the flange portion 140 in the area 140a and moves the link 44 back slightly relative to the tone arm by virtue of a slip clutch arrangement provided on the quadrant plate 130 which is attached to the tone arm post 126.

The velocity trip slip clutch arrangement of the present invention is an improvement over the arrangement shown in Dennis et al U.S. Pat. No. 4,291,886 and provides a smoothly acting frictional connection between the tone arm quadrant plate 130 and the pawl 142 through the intermediate link 44. More particularly, a clutch member 150 (FIG. 9) is provided with a hub portion 152 having an inwardly extending ring portion 154 which is positioned around the annular shoulder 156 formed in the bottom of the post 126 so that the hub portion 152 rests on the upper surface of the quadrant plate 130 and may be rotated about the axis of the post 126. A radially extending arm portion 158 of the clutch 150 is urged into engagement with the upper edge of an upstanding wall portion 160, formed in the quadrant plate 130, by means of a tension coil spring 162 the enlarged upper head portion 164 of which is positioned in an opening 166 formed in a boss portion 168 on the arm 158. The wall portion is provided with the upstanding posts 161 and 163 at either end thereof to limit movement of the arm 158 along the wall 160. The tension spring 162 (FIG. 10) extends through a large clearance opening 170 in the quadrant plate 130, the bottom end of the spring 162 being connected to a hook portion 172 provided at the bottom end of a semi-cylindrical sleeve portion 174 extending downwardly from the quadrant plate 130 and formed integrally therewith. The outer end of the link 44 is provided with a right angle end portion 176 (FIG. 9) which is pivotally mounted in an opening 178 in the end of the arm 158 so that movement of the link 44 when the pawl flange area 140a is struck by the turntable lug 146 produces pivotal movement of the clutch member 150 about the axis of the post 126 relative to the quadrant plate 130. During such movement the arm 158 slides along the top of the wall 160 and the bottom surface of the hub portion 152 slides on the surface of the quadrant plate 130 adjacent the annular shoulder ring 156. The spring 162 is positioned between these two spaced apart points of frictional contact between the clutch 150 and the plate 130 and by virtue of the tension in the spring holds these two spaced apart frictionally engaging surfaces together with a slight force which may be overcome when the link 44 is moved outwardly by engagement of the lug 146 with the pawl flange area 104a.

Since the spring 162 is in tension there is no tendency for this spring to wind up as the link 44 is repeatedly reset each time the lug 146 strikes the pawl flange 140 so that the clutch 150 may be repetitively reset as the tone arm moves inwardly without producing a jumpy or jerky motion in the velocity trip mechanism. In the arrangement shown in Dennis et al U.S. Pat. No. 4,291,886, and other velocity trip mechanisms, a compression spring is used which is mounted about the axis of the relatively movable members of the clutch mechanism so that the compression spring has a tendency to wind up upon repeated resetting of the trip clutch and then produces a jerky motion as the energy in the wound up spring is released. In the arrangement of the present invention the tension spring 162, which is of considerable length and comprises a large number of turns, simply leans slightly as the arm portion 158 is moved along the entire length of the wall 160. This leaning motion of the spring 160 is insufficient to produce any erratic or nonuniform movement of the velocity trip clutch as the tone arm moves over the final grooves of the record and into engagement with the lead out groove on the record.

While the improved velocity trip clutch arrangement of the present invention is employed adjacent the tone arm end of the link 44, it will be understood that a similar velocity trip friction clutch arrangement may be employed at the gear end of the link 44. In such an arrangement two trip pawls are pivotally mounted on the gear, as shown in FIG. 43 of Dennis et al U.S. Pat. No. 4,291,886, and a tension coil spring is provided between spaced apart frictional surfaces on these pawls to provide a similar smoothly acting velocity trip clutch arrangement, as will be readily understood by those skilled in the art.

When the lead out groove on the record is reached the tone arm moves rapidly inwardly so that the shoulder 180 on the pawl 142 is moved into the path of the turntable lug 146 and the gear 40 is rotated sufficiently for the teeth thereof to engage the teeth of the turntable gear 42 so that the gear 40 is rotated one revolution during an automatic shutoff cycle. As the gear 40 rotates the pin 72 follows the control track 76 and rotates the control arm 62 so that the post portion 92 of the tone arm lift member 80 engages the ramp 96 and lifts the tone arm off the record. As the gear 40 continues to rotate the clutch 46 connects the link 44 to the gear 40 so that the tone arm 36 is moved outwardly into engagement with the rest post 38.

The clutch 46 of the present invention functions generally similarly to the arrangement shown in Dennis et al U.S. Pat. No. 4,291,886 and reference may be had to this patent for a detailed description of such operation. However, the clutch 46 of the present invention has certain advantages over the arrangement shown in Dennis et al U.S. Pat. No. 4,291,886, which advantages will now be described. Referring to FIGS. 11 and 12, the clutch 46 comprises a pin 190 which is loosely mounted in the opening 192 in the gear 40 and is provided with a solid head portion 194 positioned in a recess 196 in the bottom of the gear 40. The pin 190 is provided with a vertically extending slot 198 through which the link wire 44 extends. A coil spring 200 is positioned between a shoulder 202 formed in the upper end of the pin 190 and a washer 204.

During playing cycles, when the link 44 is loosely positioned in the slot 198 and is used as a velocity trip member, the washer 204 rests on a shoulder 206 formed in the pin 190 and the pin 190 is held within the opening 192 by means of the shoulders 208 (FIG. 12) which rest on the surface 210 of the gear 40 so that the head portion 194 is out of engagement with the bottom surface of the gear 40, as shown in FIG. 11. As the gear 40 rotates during the automatic shutoff cycle the upstanding shoulders 212, which are positioned on opposite sides of the pin 190, move into engagement with the underside of the link 44 and urge the pin upwardly until the head portion 194 thereof is moved into engagement with the recess 196, as shown in FIG. 12. The link 44 is thus urged into engagement with the top walls of the shoulders 212 by the coil spring 200 to provide sufficient frictional engagement between the link 44 and the gear 40 to move the tone arm outwardly against the rest post 38 during the first half of the automatic shutoff cycle, the pin 190 rotating within the opening 192 during such movement.

In the clutch arrangement shown in the Dennis U.S. Pat. No. 4,291,886 the force urging the link 44 into engagement with the shoulders 212 was provided by a pair of flexible feet instead of the solid head portion 194 of the present arrangement. These flexible feet could take a set at different angles and could provide different biasing forces in different production lots so that the force available to connect the wire 44 to the gear 40 could vary from unit to unit on a mass production basis. In the arrangement of the present invention the coil spring 200 provides an accurately predetermined force holding the link 44 into engagement with the top walls of the shoulders 212 as the gear 40 rotates so that positive and reliable tone arm movement is achieved. Furthermore, the number of turns or size of wire of the coil spring 200 may be readily changed to provide more or less clutch force so that adaptations can readily be made to the clutch 46 during mass production. In this connection it will be understood that the washer 204, may be eliminated so that the coil spring 200 rests on the top of the link 44, if desired. However, slightly better friction is provided if the washer 204 is employed.

After the tone arm 36 is moved outwardly into engagement with the rest post 38 at mid cycle, it is lowered into engagement with the rest post and is positioned behind a retaining lug 220 (FIG. 7) on the rest post 38 so that the tone arm 36 is restrained on the rest post while the clutch 46 slips as the gear continues to rotate during the last half of the automatic shutoff cycle. More particularly, during the mid portion of the automatic shutoff cycle, the pin 72 is moved into engagement with the portion 222 (FIG. 3) of the control track 76 so that the control arm 62 is rotated in the opposite direction and the post 92 on the lift member 80 is moved back down the ramp 96 to lower the tone arm 36 into engagement with the rest post during the mid portion of the automatic shutoff cycle. As the control pin 72 moves along the control track 76 it is positioned at the lowest level 252 until it encounters a ramp 77 which leads to the highest level 293 on the gear 40 at which level the pin 72 remains until it encounters the ramp 286 and is moved back down to the level 252 of the notch 78.

While the tone arm 36 remains on the rest post during the last half of the automatic shutoff cycle, the control track 76 is shaped so that the control arm 62 is not moved back to its outermost rest position, shown in FIG. 3, until the end of the shutoff cycle when the pin 72 is then positioned in the notch portion 78 of the control track 76. Accordingly, even though the control arm 132 on the quadrant 130 is moved to its shutoff position at mid cycle, it is not until the end of the automatic shutoff cycle that the switch arm 124 is moved to engagement with the control arm 132 and thereby opens the switch 120 so that the motor 48 is deenergized and the turntable 34 stops. This completes an auto return cycle of the single record player of the present invention.

In accordance with an important aspect of the present invention, facilities are provided for playing a record positioned on the turntable 34 twice even though the record is played the first time in the auto return mode wherein the tone arm 36 is manually positioned on the record by the operator. Such a repeat arrangement requires that after the record has been played once an automatic setdown cycle is initiated during which the tone arm 36 does not remain on the rest post but instead is automatically indexed to the correct position to engage the lead in groove of a seven inch or twelve inch record on the turntable 34. Since the tone arm 36 does not remain on the rest post at the end of this automatic set down cycle, the shutoff switch 120 is not opened even through the control arm 62 is moved to its outermost shutoff position when the pin 72 is positioned in the notch 78 at the end of the automatic setdown cycle and remains in this position during the second playing of the record.

In order to prevent the tone arm 36 from being lowered onto the rest post 38 during the mid portion of the automatic set down cycle, the gear 40 is provided with a second control track 230 the major portion of which is positioned inside of and above the control track 76 at the highest level 293. The second control track 230 includes a detent notch portion 232 which is positioned inside of and in radial alignment with the detent notch portion 78 of the control track 76 at an intermediate level 250 on the gear 40. In order to position the cam follower pin 72 of the control arm 62 into the notch 232 when a repeat play type of operation is to be performed, a control knob 234 is positioned to extend outwardly through the side of the raised housing 58, the control knob 234 comprising an arm extension portion on the end of an L-shaped member 236 which is slidably mounted in the base 32. A control link 238 is mounted in the arm portion 246 (FIG. 1) of the L-shaped member 236 from which the control knob 234 extends, the control link 238 having a right angle end portion 240 at the free end thereof which is adapted to engage an upstanding flange portion 242 on the control arm 62 when the control knob 234 is in the neutral or off position shown in full lines in FIG. 1. The control link 238 is provided with a reversely bent end portion 244 which is mounted in the arm portion 246 of the L-shaped member 236 to retain that end of the control link 238.

When the control knob 234 is moved forwardly to the repeat position 248 shown in dotted lines in FIG. 1, the right angle end portion 240 of the control link 238 engages the flange 242 and rotates the control arm 62 so that the cam follower pin 72 is moved inwardly into engagement with the detent notch 232 on the inner control track 230. During such movement the upward bias on the cam follower pin 72 which is provided by the torsion spring arm 102 functions to move the pin 72 upwardly into engagement with the portion 250 of intermediate level on the gear 40 which is higher than the portion 252 at which notch 78 in the outer control track 76 is formed but lower than the highest level 293 of the gear 40. Also, the rotational bias provided by the spring arm 102 holds the pin 72 in engagement with the notch 232 so that the control knob 234 remains in the repeat position 248.

In the auto return-repeat mode the tone arm 36 is manually placed on a record on the turntable 34 after the control knob 234 has been moved to the repeat position 248, it being noted that the slight movement of the control knob 234 to the repeat position 248 is sufficient to rotate the control arm 62 by an amount such that the switch 120 is closed and the motor 48 energized. The record is then played and at the end of this record the link 44 is moved inwardly by an amount sufficient to initiate an automatic cycle in the manner described in detail heretofore so that the gear 40 starts to rotate. However, during this automatic set down cycle the cam follower pin 72 follows the inner track 230 as the gear rotates. When the pin 72 is positioned in the notch 232 and an automatic set down cycle is initiated, the pin 72 initially moves along an area 250 of intermediate level and then at point 300 moves upwardly to the highest level 293 and remains at this level for the duration of the control track 230 until the ramp 286 forces the pin 272 downwardly into the level of the notch 78, i.e., the level 252.

From FIG. 3 it will be seen that the control track 230 does not include an outwardly diverging portion, similar to the portion 222 of the outer control track 76, so that as the gear 40 rotates during the automatic set down cycle the tone arm is not lowered into engagement with the rest post 38 because the post portion 92 of the lift member 80 remains on the upper platform portion 98 of the control arm 62. Accordingly, during the last half of the automatic set down cycle the tone arm 36 is moved inwardly.

In order to index the tone arm for automatic positioning over the lead in groove of either a seven inch or a twelve inch record, a size selector member 260 (FIG. 17) is pivotally mounted on a post 262 which extends downwardly from a speed control lever 264 to the outer end of which the speed control knob 56 is connected. The speed control lever 264 is pivotally interconnected with a second speed control lever 266 which is pivotally mounted on a post 268 on the base member 32, the levers 264 and 266 being pivotally interconnected at the point 270 so that as the speed control knob 56 is moved from the 45 rpm, seven inch position shown in FIG. 1 to the 33⅓ rpm, twelve inch position shown in dotted lines at 272, the belt 50 is shifted from the lower large diameter step on the turret 52 to the upper smaller diameter step thereof, as will be described in more detail hereinafter.

The size control member 260 is also slidably mounted on the reference post 108 by means of a clearance slot 276 (FIG. 3) which permits reciprocal motion of the size selector member 260 in response to rotation of the speed selector knob 56. The end portion 274 of the size selector 260 is provided with a shoulder 278 which is adapted to be positioned in the path of either a seven inch indexing ledge 280 (FIG. 17), which extends above the upper surface of the quadrant 130, or a raised twelve inch indexing ledge 282 on the quadrant 130. Accordingly, as the tone arm 36 is moved inwardly during the last half of the automatic shutdown cycle the shoulder 278 engages the end of either the ledge 280 or the ledge 282, depending upon the setting of the speed control knob 56. Upon engagement of the shoulder 278 with one of the ledges 280, 282 the tone arm is prevented from further inward movement and as the post 92 moves back down the cam surface 96 on the control arm 62 at the end of the automatic set down cycle the tone arm is lowered into engagement with the lead in groove of the record so that the record is played a second time.

In order to raise the end portion 274 of the size control member 260 upwardly above the indexing cam surfaces 280 and 282 at the end of the automatic set down cycle, and thereby permit the tone arm to move inwardly over the record during the playing cycle, the control arm 62 is provided with an upstanding flange portion 283. As the control arm 62 is rotated to the final position shown in FIG. 3, the flange 283 engages a camming shoulder 285 provided on the bottom surface of the size selector member 260 and lifts the outer end 274 of the member 260 upwardly above the seven inch and twelve inch indexing raised portions 280 and 282 on the quadrant 130 to permit inward movement of the tone arm during the playing cycle. However, the flange 283 does not engage the cam shoulder 285 until after the shoulder 278 on the member 260 has been employed to index the tone arm to the correct seven inch or twelve inch position as it is automatically lowered to the record on the turntable.

In order that the record player will be shut off after the record is played a second time, the cam follower pin 72 is not led back into the notch 232 of the inner control track 230 but instead is led into engagement with the notch 78 on the outer control track 76. This is accomplished by causing the latter portion 284 (FIG. 3) of the control track 230 to be coincident with the corresponding portion of the outer track 76 and providing a ramp portion 286 which leads the cam follower pin downwardly into engagement with the level 252 on the gear 40 at which the V-shaped notch 76 is provided. Since the tone arm 36 is moved away from the rest post 38 after the mid portion of the automatic set down cycle and is automatically positioned on the lead in groove on the record on the turntable, the shutoff switch 120 is not opened at the end of the automatic set down cycle when the pin 72 is positioned in the notch 78 and the control arm 62 is in the position which normally causes shutoff of the machine. However, after the record has been played twice an automatic shutoff cycle is initiated during which the pin 72 follows the outer control track 76 so that the tone arm is lowered into engagement with the restraining lug 220 at mid cycle and remains in this position until the end of the automatic shutoff cycle at which time the switch 120 is opened and the machine is turned off, as described in detail heretofore.

The speed control lever 264 is rotatably mounted on a depending post 261 on the base 32 and has an upstanding flange 263 on the outer end thereof. The speed control lever 266 is positioned above the lever 264 and is rotatably mounted on the post 268, the lever 266 having a slot 265 (FIG. 1) through which the post 261 extends. The lever 266 has an upstanding flange 267 on the outer end thereof which is provided with a downwardly inclined camming surface 269 (FIG. 8). The flange 263 on the lever 264 has an upwardly inclined camming surface 271. One arm 277 of a spring 273 is rotatably mounted on a post 275 on the base 32 and the other arm of the spring 273 is positioned in a slot in the lever 264 so as to bias the speed control knob 56 to the 45 rpm position shown in full lines in FIG. 1. When the knob 56 is moved to the 33⅓ rpm position 272, the spring arm 277 rotates in the post 275 and biases the lever 264 to this position as the camming surface 271 engages the outer surface of the belt 50 and moves it upwardly to the 33⅓ rpm step on the turret 52. When the knob 56 is moved back to the 45 rpm position the camming surface 269 engages the outer surface of the belt 50 and moves it downwardly to the larger diameter 45 rpm step on the turret 52.

In accordance with a further aspect of the present invention, the control knob 234 acts as a cuing lever when it is moved rearwardly of the neutral or off position shown in full lines in FIG. 1 so that the tone arm 36 is lifted to an upper cuing position in which it can be manually adjusted from a position over the rest post 38 to a position over the lead in groove of the record on the turntable 34, after which the control knob 234 is moved back to the neutral position of FIG. 1 and lowers the tone arm into engagement with the lead in groove of the record. Furthermore, this cuing function of the control knob 234 is provided without requiring any additional parts to be added to the mechanism. More particularly, the L-shaped member 236, to the arm portion 246 of which the control knob 234 is integrally formed, is provided with a head portion 380 (FIG. 5) which is positioned adjacent the forward bottom edge of the flange portion 84 of the tone arm lift member 80 when the control knob 234 is in the neutral position shown in FIG. 1. Specifically, the head portion 380 is provided with an inclined camming surface 382, the head portion 380 being wider than the adjacent arm portion of the L-shaped member 236 and positioned so that the flange 84 engages the head portion 380 at approximately the mid point of the width thereof, as best illustrated in FIG. 1.

When the control knob 234 is moved rearwardly to the position shown in dotted lines at 378 in FIG. 1, the engagement of the inclined shoulder 382 with the flange 84 lifts the tone arm lift member 80 upwardly so that the tone arm is lifted off of the rest post 38 to an upper cuing level at which level the tone arm may be swung over the lead in groove of a record on the turntable 34 after which the control knob 234 is moved back to the neutral position shown in full lines in FIG. 1. During such movement the flange 84 rides back down the inclined shoulder 382 so as to lower the tone arm into engagement with the lead-in groove of the record as the control knob 234 is moved back to the neutral position. In this connection it should be noted that rearward movement of the control knob 234 is limited by engagement of the arm portion 246 with the post 268 which supports the speed control lever 264.

In accordance with a further important aspect of the present invention, the single record player of the present invention is also arranged to be operated in a fully automatic set down mode in which the tone arm is automatically lowered into engagement with the lead in groove of a record on the turntable 34 in accordance with the position of the combined speed selector and size control knob 56. More particularly, when the control knob 234 is moved forwardly beyond the repeat position 248 to the position shown in dotted lines at 290 in FIG. 1, the cam follower pin 72 is moved inwardly past the notch 232 and into a detent notch 292 at the highest level 293 on the gear 40 which retains the control arm 62 in this position with the control knob 234 in the position 290. At the same time, movement of the control knob 234 to the position 290 causes the pin 72 to engage an end flange 294 (FIG. 3) on the arm 296 of the trip pawl 142, the end of the arm 296 extending through a clearance opening 298 in the gear 40 so that the end flange 294 can be engaged by the cam follower pin 72 on the underside of the gear 40. When the pin 72 engages the end flange 294 it rotates the trip pawl 142 so that the shoulder 180 is moved into the path of the turntable lug 146 and an automatic set down cycle is thereby initiated.

As the gear 40 rotates during this automatic set down cycle, the pin 72 moves out of the notch 292 along a control track portion 300 until it reaches the point 302 at which point the pin 72 thereafter follows the inner control track 230 on the gear 40. Accordingly, in response to movement of the control knob 234 to the position 290 an automatic set down cycle is immediately initiated during which the tone arm is lifted upwardly away from the retaining lug 220 during the first half of the automatic set down cycle and during the second half of the automatic set down cycle the tone arm is positioned over the lead in groove of the record and lowered onto the record at the end of this cycle in the manner described in detail heretofore.

During this automatic set down cycle, the cam follower pin 72 is led into the common portion 284 of the control tracks 76 and 230 and down the ramp portion 286 so that it is positioned in engagement with the outer notch 78 at the end of this automatic set down cycle. Accordingly, after the record is played once an automatic shutoff cycle is initiated during which the pin 72 follows the outer track 76 and lowers the tone arm 36 into engagement with the rest post and shuts the machine off, as described in detail heretofore in connection with the auto return mode. In this connection it will be understood that the notch 292 and initial track portion 300 may be eliminated if desired, the notch 292 functioning only to retain the control knob 234 initially in the forwardmost position 290. In such case the intermediate level 250 is eliminated on the gear 40 and the notch 232 is at the highest level 293 on the gear 40. If the notch 292 and track portion 300 are eliminated, the control knob 234 must still be moved forwardly to the position 290 in order for the pin 272 to engage the end flange 294 and move the trip pawl 142 to initiate an automatic set down cycle. However, after the control knob 294 has been moved forwardly to the position 290, it will return to the repeat position 248 in which the pin 72 engages the notch 232 of the inner control track 230 and an automatic set down cycle is performed as described in detail heretofore.

In accordance with a further aspect of the present invention, the single record player may be operated in a combined automatic set down and repeat mode. In this mode the control knob 234 is moved to the forwardmost position 290 so as to initiate an automatic set down cycle during which the tone arm is automatically positioned in engagement with a record on the turntable 34 in the manner described in detail heretofore. At the end of this automatic set down cycle the control arm 62 is moved to its final position shown in FIG. 3 and the flange portion 242 thereof engages the right angle end portion 240 of the control wire 238 and pulls the control knob 234 back to the neutral position shown in FIG. 1. After playing of the record the first time has been thus initiated, if the control knob 234 is then moved to the intermediate repeat position 248 the cam follower pin 72 is moved into engagement with the notch 232 on the inner control track 230. Accordingly, after the record is played the first time, another automatic set down cycle is intiated and the tone arm 36 is moved outwardly into engagement with the rest post 38 and then moved inwardly and downwardly into engagement with the lead in groove of the record 34 so that it is played a second time. Near the end of this second automatic shutoff cycle, the pin 72 is again moved down the ramp 286 and positioned in engagement with the notch 78 of the outer control track 76. Accordingly, after the record has been played a second time an automatic shutoff cycle is initiated in which the tone arm is positioned on the rest post and the machine shut off, as described in detail heretofore.

In accordance with a further aspect of the present invention an adapter for 45 rpm large hole records is provided which adapter also acts as the centering spindle for small hole records. With such an adapter the turntable 34 may be rotatably mounted on the base member 32 in a manner which results in substantial cost savings. In addition, such adapter provides an arrangement which has the esthetic appearance of more expensive turntables. Furthermore, since this adaptor rotates with the turntable there is no movement between the centering spindle portion of the adaptor and the inner edge of the record as the turntable rotates. With a conventional stationary centering spindle the record is moved relative to the stationary spindle which results in objectionable noise and wear on the center hole of the record when the record is being played. More particularly, a 45 rpm adapter indicated generally at 310 (FIG. 2), is provided which is removably mounted within a central well or recess 312 in the turntable 34. The adapter 310 is provided with an integrally formed cylindrical stub spindle portion 314 which projects upwardly beyond the upper surface 316 of the turntable 34 when the adapter 310 is in a lower position shown in FIG. 16 so that the stub spindle portion 314 can act as a centering spindle for small hole records which are placed on the turntable 34. The top wall 318 of the adapter 310 may completely fill the recess 312 in the turntable, if desired, so that when the adapter 310 is in its lower position the single record changer of the present invention has the appearance of a high priced turntable. In addition, the adapter 310 completely encloses the central portion of the turntable 34 so that this turntable can be inexpensively mounted by employing an unplated stub shaft 320 to rotatably mount the turntable 34. More particularly, the stub shaft 320 is secured within an opening 322 (FIG. 2) formed in the boss portion 324 of the base member 32 by means of a nut 326 which is threaded onto the bottom end portion of the stub shaft 320. An end bearing washer 328 is mounted on the shoulder 330 of the stub shaft 320 and supports the sleeve bearing 332 provided in the central hub portion 334 of the turntable 34. The stub shaft 320 extends slightly above the sleeve 332 and the turntable 34 is retained on the stub shaft 320 by means of the C washer 336. With such an arrangement the stub shaft 320 may be made of very inexpensive material, such as unplated cold rolled steel and will not be subjected to rusting because it will be protected by the lubrication of the sleeve bearing 332. Accordingly, a substantial cost savings is achieved by employing the adapter 310 which takes the place of the expensive stainless steel small hole centering spindle and turntable shaft arrangement of prior art arrangements.

The bottom wall 340 of the turntable well 312 is provided with a pair of opposed large openings 342 and 344 (FIG. 14) and a pair of smaller openings 346 and 348 positioned at right angles to the openings 342, 344. The adapter 310 is provided with four downwardly, axtending positioning legs 350 which extend through the openings 342–348 when the adapter is in the lower position shown in FIG. 16. The adaptor 310 is thus rotated with the turntable 34 so that there is no movement between the centering spindle portion 314 thereof and the inner edge of the record and noise and wear are avoided.

The adapter 310 is also provided with a pair of opposed retaining legs 352 and 354 which also extend downwardly through the openings 342 and 344 when the adapter is in the lower position. The adapter 310 is held in this lower position by engagement of the central annular wall portion 356 of the adapter with the bottom wall 240 of the turntable recess 312. However, the adapter 310 can be moved to an upper position by grasping the spindle portion 314 thereof and lifting the adaptor 310 upwardly to the position shown in FIG. 2. If the adaptor is then rotated while it is in the upper position the positioning feet 350 will rest on the bottom wall 340 of the turntable well, as shown in FIG. 2. When the adapter 310 is in this upper position the large diameter annular top wall 318 of the adapter is positioned above the upper surface 316 of the turntable 34 and acts as a large hole centering spindle for a large hole 45 rpm record. It will again be noted that since the adaptor 310 is rotating with the turntable 34 there is no movement between the top wall 318 and the inner edge of a large hole 45 rpm record so that noise is avoided.

When the adapter 310 is in the upper position shown in FIG. 2, the retaining legs 352, 354 prevent the adapter 310 from being removed from the recess 312 because the feet will engage the outer wall 358 of this recess. However, by compressing the flexible retaining legs 352, 354 inwardly the adapter 310 can be entirely removed from the recess 312 which exposes the large openings 342, 344 in the bottom wall 340 of the turntable well 312 and provides access to the retainer 336 to permit removal of the turntable 34.

In accordance with a further important aspect of the invention, one of the openings 342, 344 is used as an access opening to gain access to a mounting screw or transit screw located near the center of the turntable 34 on the sub base unit 30 so that this sub base unit can be mounted, either solidly or with shock absorbing springs, to the main base or cabinet 60 of the phonograph. More particularly, if the sub base unit is to be mounted solidly a first mounting screw 360 is provided in the upper right hand corner of the sub base 30, as viewed in FIG. 1, and a second mounting screw 362 is provided on the base member 32 adjacent the turntable gear 42 and in the area of the openings 342, 344 in the turntable 34. When the complete sub base unit 30 is received at the phonograph manufacturer's plant, the base member 32 is positioned within the cabinet 60 and the mounting screw 360 is then secured to the corresponding portion of the cabinet 60 immediately therebelow. The adapter 310 is then moved to the upper position and the retaining legs 352, 354 compressed so as to remove the adapter 310 from the turntable 34 which is then rotated so that one of the openings 342, 344 is immediately over the screw 362 which can then be tightened by inserting a screwdriver through the opening 342 or 344 and tightening the screw 362 into the portion of the cabinet 60 immediately below so that the sub base unit is solidly mounted within the cabinet 60. The 45 rpm adapter 310 is then reinserted into the well 312 and the phonograph is complete. All of the disadvantages discussed heretofore in connection with the removal of the turntable in order to mount the sub base within the main base of the phonograph are thereby avoided in accordance with the arrangement of the present invention.

In the event that the sub base unit 32 is to be shock mounted within the cabinet 60, a series of coil springs 364, 366 and 368 are mounted on the underside of the base member 32 so as to provide a three point suspension for the base member 32 in the main base 60. In place of the mounting screws 360 and 362 a pair of transit screws 361 and 363 may be employed, as shown in FIGS. 2 and 4, which are provided with clips 365 on the bottom ends thereof which may be positioned either parallel to the axis of the screw or turned 90 degrees thereto. Initially, the clips are positioned parallel to the screw so that they may be inserted through corresponding openings, such as the opening 361a (FIG. 4), in the cabinet 60 immediately below the transit screws after which the clips are positioned in the 90 degree position and the transit screws are rotated counterclockwise to lift the clips into engagement with the underside of the cabinet 60 and clamp the sub base 30 to the cabinet 60 solidly (as shown in FIG. 4) by compressing the springs 364, 366 and 368 so that the phonograph may be shipped without damage thereto. During such operation the transit screw 363 at the center of the turntable 34 is accessed by removing the adapter 310 in the manner described in detail heretofore so that the transit screw can be tightened through one of the openings 342, 344 in the turntable 34.

If desired, the main cabinet 60 can be provided with a notch 372 in the area of the transit screw 362 so that the clip on the end of this transit screw can be initially positioned at right angles to the screw and the sub base unit 30 inserted into the cabinet by moving the transit screw 362 through the notch 372 to the desired position. This eliminates the additional step of inserting the transit screw 362 downwardly through the opening with the clip positioned parallel to the screw and then moving the clip to the ninety degree position after insertion. It will be understood that after the completed phonograph is shipped to the final destination, the transit screws 361 and 363 are tightened by rotating them in the clockwise direction so as to move the clip portions thereof downwardly and away from the associated areas of the cabinet 60 so that the sub base unit is then shock mounted on the springs 364, 366 and 368. During such operation the adapter 310 is again removed from the turntable 34 to provide access to the transit screw 363.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a record player, the combination of, a rotatable turntable, means for rotating said turntable, a tone arm pivotally mounted at a point beyond said turntable and having a cartridge receiving outer end, a tone arm lift member vertically movable to engage said tone arm and raise the outer end thereof, a control knob, means responsive to movement of said control knob to a first position for moving said lift member upwardly, thereby to raise the outer end of said tone arm to a cueing position above said turntable without energizing said turntable rotating means, and means responsive to the movement of said control knob to a second position for energizing said turntable rotating means.

2. The combination of claim 1, which includes means responsive to movement of said control knob to a third position for initiating an automatic cycle in which said tone arm is automatically moved into engagement with the lead in groove of a record positioned on said turntable.

3. The combination of claim 2, which includes means responsive to movement of said control knob in said opposite position for playing a record on said turntable twice.

4. The combination of claim 1, which includes a control member interconnected with said control knob and movable in a horizontal plane when said control knob is moved to said first position, said control member having a cam surface which engages said lift member and moves it upwardly as said control knob is moved to said second position.

5. The combination of claim 4, which includes a base member, said lift member including a vertically extending flange portion slidably mounted in said base member for movement in a vertical plane, and means positioning said control member so that said cam surface engages said flange portion and moves said lift member upwardly as said control knob is moved to said first position.

6. In a record player, the combination of, a rotatable turntable, means for rotating said turntable, a tone arm pivotally mounted at a point beyond said turntable and having a cartridge receiving outer end, a tone arm lift member vertically movable to engage said tone arm and raise the outer end thereof, a control knob, means responsive to movement of said control knob in one direction from a neutral position for moving said lift member upwardly so that the outer end of said tone arm is lifted without energizing said turntable rotating means, means responsive to the movement of said tone arm toward said turntable for energizing said turntable rotating means, and means responsive to the movement of said control knob in the opposite direction from said neutral position for energizing said turntable rotating means.

7. The combination of claim 6, which includes means responsive to said movement of said control knob in said opposite direction for initiating an automatic cycle in which said tone arm is automatically moved into engagement with the lead in groove of a record positioned on said turntable.

8. The combination of claim 6, which includes a rest post positioned beyond the edge of said turntable, said tone arm being positioned on said rest post when said control knob is in said neutral position, and means responsive to movement of said control knob in said opposite direction for playing a record on said turntable twice and returning said tone arm to said rest post.

9. The combination of claim 8, which includes means for disabling said turntable rotating means when said tone arm is returned to said rest post after the record has been played twice.

10. In a record player, the combination of, a gear, means for rotating said gear one revolution during an automatic cycle, a tone arm mounted for rotation about a fixed point which is spaced from said gear, an elongated link member, means interconnecting one end of said link member with said tone arm, a pin rotatably mounted on said gear at a point offset from the center thereof and having an opening through which said link member extends, a coil spring positioned on said pin between said link member and the upper end of said pin, and cam means on said gear and adapted to engage said link member and lift it upwardly against the force of said coil spring so that said link member is held in frictional engagement with said gear with a force sufficient to rotate said tone arm about said fixed point as said gear rotates during the automatic cycle.

11. The combination of claim 10, which includes a washer positioned on said pin between said link member and said coil spring and wherein said cam means comprises a pair of upstanding ledges on said gear which are positioned on opposite sides of said pin, said washer being biased against a shoulder on said pin by said coil spring and lifted off of said shoulder by engagement of said link member with said upstanding ledges.

12. The combination of claim 11, wherein said pin is loosely mounted in an opening in said gear and is provided with a rigid head portion adapted to engage the underside of said gear when said washer is lifted off of said shoulder, said pin having a pair of outwardly projecting lugs which engage the upper side of said gear to loosely retain said pin within said opening when said link member is out of engagement with said ledges.

13. The combination of claim 11, wherein said pin is provided with a second shoulder adjacent the upper end thereof, and said coil spring is positioned between said second shoulder and said washer and urges said washer against said first named shoulder.

14. In a record player, the combination of, a rotatable turntable, a tone arm pivotally mounted beyond the edge of said turntable, and a velocity tripping mechanism responsive to movement of said tone arm during the playing of a record on said turntable, said velocity tripping mechanism comprising a first member rotatable about an axis, a second member pivotally mounted on said first member for rotation relative to first member about said axis, said members having a first point of frictional contact spaced away from said axis and a second point of frictional contact near said axis, a tension coil spring extending parallel to said axis and having the ends thereof connected to said first and second members at points between said first and second points of frictional contact so that the tension of said spring holds said first and second members together with a slight force, means for moving said first and second members about said axis in one direction as the tone arm moves inwardly over the record, and means for moving said second member a predetermined amount in the opposite direction relative to said first member each revolution of said turntable by overcoming said slight force exerted therebetween by said tension coil spring.

15. The combination of claim 14, wherein said axis about which said first and second members are rotatable coincides with the pivotal axis of said tone arm.

16. The combination of claim 14, wherein said first member comprises a flat plate connected to said tone arm and having an upstanding rib spaced from the axis of said tone arm, and said second member comprises a hub portion mounted on said plate for rotation about said tone arm axis and a radially extending arm portion the outer end of which rests on said upstanding rib, said tension spring being connected to said arm portion between said outer end and said hub portion.

17. The combination of claim 16, wherein said upstanding rib has upstanding lug portions at the ends thereof which limit the extent of movement of said arm portion along said rib.

18. In a record player, the combination of, a gear, a rotatable turntable, means for rotating said gear one revolution during an automatic shut-off cycle, a pivotally mounted tone arm, an elongated link member, means for interconnecting one end of said link member with said tone arm, means operative during said shut-off cycle for frictionally connecting the other end of said link member to said gear so that as said gear rotates during said shut-off cycle said tone arm is moved outwardly, said link member being disengaged from said gear and moving with said tone arm during the playing of a record on said turntable, velocity tripping means responsive to said movement of said link member during the playing of a record for initiating said automatic shut-off cycle, said interconnecting means including a first member movable with said tone arm, a second member connected to said one end of said link member and movable relative to said first member about the axis of said tone arm, said second member frictionally engaging said first member at two spaced apart points, a third member movable with said tone arm, and a tension coil spring connected to said second member between said spaced apart points and connected to said third member at a point below said first and second members so that the tension of said spring holds said first and second members in frictional engagement at said spaced apart points.

19. The combination of claim 18, wherein said tension spring extends between said second and third members through a clearance slot in said first member.

20. The combination of claim 18, wherein said tension coil spring has a large number of turns, so that small variations in the tension thereof can be readily obtained by adjusting the number of turn thereof.

21. In a record player, the combination of a base member, a stub shaft supported on said base member and extending upwardly therefrom, a turntable rotatably mounted on said stub shaft and having a recess and a central hub portion at the center thereof, an integrally formed 45 rpm adapter positioned in said recess to cover said stub shaft and having a cylindrical upwardly projecting portion at the center thereof, said adapter having a centering sleeve engaging the outer periphery of said central hub portion and being movable from a lower position in which said projecting portion extends above the upper surface of said turntable and acts as a centering spindle for a small hole record positioned on said turntable to an upper position in which a wider portion of said adapter extends above the upper surface of said turntable and acts as a centering spindle for a large hole 45 rpm record positioned on said turntable, said turntable having an opening formed therein beneath said adapter, said adapter having a resilient retaining leg extending through said opening for preventing said adapter from being removed from said recess.

22. The combination of claim 21, wherein said wider portion of said adapter is positioned at or below the surface of said turntable when said adapter is positioned in said lower position and substantially fill said recess.

23. The combination of claim 21, which includes means responsive to rotation of said adapter relative to said turntable while adapter asaid member is in said upper position for retaining said adapter in said upper position.

24. A record player as recited in claim 21 wherein said adapter has a plurality of positioning feet extending therefrom, said positioning feet engaging said turntable within said recess when said adapter is in the lower position.

25. The combination of claim 21, which includes means for retaining said adapter within said recess while permitting movement thereof between said upper and lower positions.

26. In a record player, the combination of a base member, a stub shaft supported on said base member and extending upwardly therefrom, a turntable rotatably mounted on said stub shaft and having a recess and a central hub portion at the center thereof, an integrally formed 45 rpm adapter positioned in said recess and having a large diameter portion which substantially fills said recess and covers said stub shaft, said adapter having a cylindrical portion of small diameter extending upwardly from said large diameter portion at the center thereof, said adapter having a centering sleeve engaging said central hub portion and being positionable in either lower position in which said large diameter portion is at or below the upper surface of said turntable and said projecting portion extends above the upper surface of said turntable and acts as a centering spindle for small hole record positioned on said turntable or in a upper position in which said large diameter portion extends above the upper surface of said turntable and acts as a centering spindle for a large hole 45 rpm record positioned on said turntable.

27. The combination to claim 26, which includes means responsive to rotation of said adapter relative to said turntable while said adapter is in said upper position for retaining said adapter in said upper position.

28. The combination of claim 26, which includes means for retaining said adapter within said recess while permitting movement thereof between said upper and lower positions.

29. In a record player the combination of, a main base structure, a sub base carrying a rotatable turntable a tone arm positioned to engage a record on said turntable and a motor for rotating said turntable, said sub base extending outwardly beyond the edge of said turntable through an arc of less than 120 degrees, and means for solidly securing said sub base to said main base structure without requiring said turntable to be removed from said sub base, said last named means comprising at least one screw which is accessible through an opening in said turntable, wherein said turntable has a recess in the central portion thereof, a 45 rpm large hole record adaptor normally filling said recess, said adaptor being removable to provide access to said one screw through said recess, thereby to permit said sub base to be secured to said main base structure without removing said turntable.

30. The combination of claim 29, wherein said opening in said turntable is in the bottom wall of said recess.

31. The combination of claim 29, wherein said opening is in the central portion of said turntable, and removable means for covering said turntable opening.

32. The combination of claim 31, wherein said removable means comprises a 45 rpm large hole record adaptor.

33. In a record player the combination of, a main base structure, a sub base carrying a rotatable turntable a tone arm positioned to engage a record on said turntable and a motor for rotating said turntable, said sub base extending outwardly beyond the edge of said turntable through an arc of less than 120 degrees, a plurality of mounting springs positioned between said sub base and said main base structure for resiliently mounting said sub base on said main base structure, and a plurality of transit screws threadingly mounted in said sub base and extending through openings in said main base structure to engage the underside thereof, said transit screws being rotatable to clamp said sub base solidly to said main base structure against the force of said mounting springs, thereby to prevent damage to said record player during movement or shipment thereof, at least one of said transit screws being accessible through an opening in said turntable so that said transit screws may be tightened or released without removing said turntable from said sub base, wherein said turntable has a recess in the central portion thereof, a 45 rpm large hole record adaptor normally filling said recess, said adaptor being removable to provide access to said one transit screw through said recess.

34. The combination of claim 33, wherein said opening in said turntable is in the bottom wall of said recess.

35. The combination of claim 33 wherein said opening is in the central portion of said turntable, and removable means for covering said turntable opening.

36. The combination of claim 35, wherein said removable means comprises a 45 rpm large hole record adaptor.

37. In a record player, the combination of, a base member, a turntable rotatably mounted on said base member, a rest post positioned beyond the edge of said turntable, a tone arm positioned on said base member beyond the edge of said turntable and carrying a control member, a gear mounted on said base member and driven from said turntable during an automatic shut-off cycle, a control arm pivotally mounted on said base member and having a portion biased into engagement with a control track on said gear, thereby to produce pivotal movement of said control arm as said gear is rotated, said control arm carrying a shut-off switch which is positioned in engagement with said control member when said gear is at rest and said tone arm is positioned on said rest post so that said shut-off switch is open, said shut-off switch being closed when said tone arm is moved off of said rest post and said control member is moved out of engagement with said shut-off switch, means for rotating said turntable during periods when said switch is closed, means for initiating an automatic shut-off cycle when a record positioned on said turntable has been played during which shut-off cycle said gear is rotated one revolution, and means operative during said automatic shut-off cycle for positioning said tone arm on said rest post so that said switch is opened when said gear is returned to said rest position at the end of said automatic shut-off cycle wherein said control arm includes a pin biased into engagement with a detent notch portion of said control track when said gear is in said rest position, said gear also having a second control track for controlling movement of said control arm so that said tone arm is not positioned on said rest post, and means for positioning said pin in said second control track, said player further including means defining a vertical opening in said base member, a mounting pin connected to said control arm and loosely positioned in said opening to provide said pivotal mounting for said control arm, and a spring means connected between said base member and said control arm for urging said control arm in the direction to maintain said shut off switch open when said gear is at rest and said tone arm is positioned on said rest post, said spring means also biasing said pin upwardly into engagement with either said first control track or said second control track.

38. A record player as set forth in claim 31, wherein said control arm is provided with a cam portion, and a lift member positioned to be engaged by said cam portion as said control arm is pivotally moved at the beginning of said shut-off cycle and adapted to raise said tone arm off of a record positioned on said turntable.

39. A record player according to claim 38, wherein said control track is shaped to move said cam portion out of engagement with said lift member during the mid portion of said shut-off cycle so that said tone arm is lowered onto said rest post during said mid portion of said shut-off cycle, and means for retaining said tone arm positioned on said rest post during the remainder of said shut-off cycle.

40. A record player according to claim 37, wherein said second control track includes a second detent notch in radial alignment with said first named notch, a control knob, and means responsive to movement of said control knob for moving said pin into said second detent notch.

41. A record player according to claim 40, wherein said second control track is positioned inside first control track on said gear.

42. A record player according to claim 40 wherein said second control track is positioned above said first control track, and means for biasing said pin upwardly so that said movement of said control knob causes said pin to engage said second notch.

43. A record player according to claim 37, which includes means for interconnecting said first and second control tracks so that after said pin traverses said second control track it is automatically moved into engagement with said notch in said first named control track.

44. A record player according to claim 43, wherein said second control track includes a second detent notch in radial alignment with said first named notch on said gear, a control knob, and means responsive to movement of said control knob for moving said pin into said second notch.

45. A record player according to claim 43, wherein said second control track is positioned inside of and above said first named control track, and means for biasing said pin upwardly so that said movement of said control knob causes said pin to move inwardly and upwardly on said gear and engage said second notch.

46. In a record player, the combination of, a base member, a turntable rotatably mounted on said base member, a rest post positioned beyond the edge of said turntable, a tone arm positioned on said base member beyond the edge of said turntable and carrying a control member, a gear mounted on said base member and driven from said turntable during during an automatic shut-off cycle, a control arm pivotally mounted on said base structure and having a pin in engagement with a control track on said gear, said control arm carrying a shut-off switch comprising a pair of spring arms normally biased to a closed position, said control track positioning said control arm so that one of said spring arms is in engagement with said control member when said gear is at rest and said tone arm is positioned on said rest post, thereby to open said shut-off switch, said shut-off switch being closed when said tone arm is moved off of said rest post and said control member is moved out of engagement with said one spring arm, means for rotating said turntable during periods when said switch is closed, and means for urging said pin into engagement with said control track with a force sufficient to overcome the normal biasing force of said spring arm and hold said shut off switch open when said gear is at rest and said tone arm is positioned on said rest post, said record player further including spring means connected between said control arm and said base member to provide said force, means defining a vertical opening in said base member, a mounting pin connected to said control arm and loosely positioned in said opening to provide said pivotal mounting for said control arm, said spring means also biasing said pin upwardly into engagement with the underside of said gear.

47. A record player according to claim 46, which includes spring means connected between said control arm and said base member to provide said force.

48. A record player according to claim 47, wherein said spring means comprises a torsion coil spring having one arm in engagement with said base member and the other arm in engagement with said control arm.

49. A record player according to claim 48, wherein said second control track is positioned above and inside of said first named control track, and said interconnecting means comprises a ramp portion on said gear and leading from the final portion of said second control track to said notch on said first control track.

50. In a record player the combination of, a main base structure, a sub base carrying a rotatable turntable a tone arm positioned to engage a record on said turntable and a motor for rotating said turntable, said sub base extending outwardly beyond the edge of said turntable and means for solidly securing said sub base to said main base structure without requiring said turntable to be removed from said sub base, said least named means comprising at least one screw which is accessible through an opening in said turntable, wherein said turntable has a recess in the central portion thereof, a 45 rpm large hole record adaptor normally filling said recess, said adaptor being removable to provide access to said one screw through said recess, thereby to permit said sub base to be secured to said main base structure without removing said turntable.

51. In a record player the combination of, a main base structure, a sub base carrying a rotatable turntable a tone arm positioned to engage a record on said turntable and a motor for rotating said turntable, said sub base extending outwardly beyond the edge of said turntable a plurality of mounting springs positioned between said sub base and said main base structure for resiliently mounting said sub base on said main base structure, and a plurality of transit screws threadingly mounted in said sub base and extending through openings in said main base structure to engage the underside thereof, said transit screws being rotatable to clamp said sub base solidly to said main base structure against the force of said mounting springs, thereby to prevent damage to said record player during movement or shipment thereof, at least one of said transit screws being accessible through an opening in said turntable so that said transit screws may be tightened or released without removing said turntable from said sub base, wherein said turntable has a recess in the central portion thereof, a 45 rpm large hole record adaptor normally filling said recess, said adaptor being removable to provide access to said one transit screw through said recess.

* * * * *